(12) United States Patent
Bilger et al.

(10) Patent No.: US 8,271,827 B2
(45) Date of Patent: Sep. 18, 2012

(54) MEMORY SYSTEM WITH EXTENDED MEMORY DENSITY CAPABILITY

(75) Inventors: Christoph Bilger, Munich (DE); Peter Gregorius, Munich (DE); Michael Bruennert, Munich (DE); Maurizio Skerlj, Munich (DE); Wolfgang Walthes, Munich (DE); Johannes Stecker, Munich (DE); Hermann Ruckerbauer, Moos (DE); Dirk Scheideler, Munich (DE); Roland Barth, Munich (DE)

(73) Assignee: Qimonda, Munich (DE)

( * ) Notice: Subject to any disclaimer, the term of this patent is extended or adjusted under 35 U.S.C. 154(b) by 808 days.

(21) Appl. No.: 11/953,694

(22) Filed: Dec. 10, 2007

(65) Prior Publication Data
US 2009/0150710 A1   Jun. 11, 2009

(51) Int. Cl.
*G06F 1/10* (2006.01)
(52) U.S. Cl. ........................................ 713/600; 713/322
(58) Field of Classification Search .................. 713/322, 713/600
See application file for complete search history.

(56) References Cited

U.S. PATENT DOCUMENTS

| | | | |
|---|---|---|---|
| 6,341,335 B1 * | 1/2002 | Kanai et al. | 711/137 |
| 6,412,033 B1 * | 6/2002 | Gray et al. | 710/315 |
| 6,480,198 B2 * | 11/2002 | Kang | 345/519 |
| 6,526,517 B1 * | 2/2003 | Miller et al. | 713/500 |
| 6,727,903 B1 * | 4/2004 | Yamada et al. | 345/503 |
| 6,754,858 B2 * | 6/2004 | Borkenhagen et al. | 714/720 |
| 6,968,419 B1 * | 11/2005 | Holman | 711/5 |
| 7,106,170 B2 * | 9/2006 | Wang | 340/5.71 |
| 2002/0004888 A1 * | 1/2002 | Hayakawa et al. | 711/148 |
| 2002/0188885 A1 * | 12/2002 | Sihlbom et al. | 713/600 |
| 2003/0115494 A1 * | 6/2003 | Cervantes | 713/322 |
| 2003/0131138 A1 * | 7/2003 | Allen et al. | 709/253 |
| 2004/0006658 A1 * | 1/2004 | Chae et al. | 710/35 |
| 2004/0193936 A1 | 9/2004 | Kelly | |
| 2005/0044442 A1 * | 2/2005 | Barr et al. | 713/600 |
| 2006/0053327 A1 * | 3/2006 | Li | 713/400 |
| 2006/0126770 A1 * | 6/2006 | Yamazaki | 375/372 |
| 2006/0224809 A1 * | 10/2006 | Gelke et al. | 710/305 |
| 2007/0076121 A1 * | 4/2007 | Zoso et al. | 348/462 |
| 2007/0165039 A1 * | 7/2007 | Seong et al. | 345/536 |
| 2007/0277016 A1 | 11/2007 | Risse | |
| 2008/0028166 A1 * | 1/2008 | Kniffler et al. | 711/154 |
| 2008/0084581 A1 * | 4/2008 | Kobayashi et al. | 358/1.16 |
| 2008/0112241 A1 * | 5/2008 | Anzou et al. | 365/201 |
| 2008/0192938 A1 * | 8/2008 | Patariu et al. | 380/279 |
| 2009/0006774 A1 * | 1/2009 | Bartley et al. | 711/154 |
| 2009/0006781 A1 * | 1/2009 | Bartley et al. | 711/154 |
| 2009/0119443 A1 * | 5/2009 | Tremaine | 711/6 |
| 2010/0194455 A1 * | 8/2010 | Shimura | 327/156 |

FOREIGN PATENT DOCUMENTS
DE   10 2007 024 192   11/2007

* cited by examiner

*Primary Examiner* — Kim Huynh
*Assistant Examiner* — Zahid Choudhury
(74) *Attorney, Agent, or Firm* — Cozen O'Connor

(57) ABSTRACT

A system including a central processing unit, a first memory channel being configured to couple the central processing unit to a first semiconductor memory unit, wherein the first memory channel is configured to be clocked with a first clock frequency, and a second memory channel being configured to couple the central processing unit to a second semiconductor memory unit, wherein the second memory channel is configured or configurable to be clocked with a second clock frequency smaller than the first clock frequency.

22 Claims, 4 Drawing Sheets

MEMORY SYSTEM WITH EXTENDED MEMORY DENSITY CAPABILITY

TECHNICAL FIELD

Embodiments of the present invention relate to memory systems. Some embodiments relate to a memory system using memory channels with different memory bandwidth capabilities.

BACKGROUND

Speed of system memory is a determining factor for further performance of a computer system. The most common form of system memory installed today is synchronous dynamic random access memory (SDRAM). A computer system's memory is a temporary storage area for data that needs to be available for programs to run efficiently. The faster the system memory can provide data, the more work the computer system's central processing unit (CPU) can perform. Increased data throughput between memory and CPU via memory busses or memory channels translates directly into better system performance.

However, increasing memory bandwidth by increasing the speed of a memory channel is sometimes leads to a reduced number of memory module slots or sockets per memory channel due to signal integrity problems, thus limiting the maximum memory density, i.e., the number of memory module slots, that can be used with a given number of memory channels. The number of memory channels connected to a memory controller or to a CPU is in some cases limited due to a limited number of data pins of the memory controller or the CPU.

On the other hand, due to increasing multi-core architecture of CPUs and virtualization, there is an increasing need for both, memory bandwidth and memory density in the future. These two features are, however, limiting each other.

BRIEF DESCRIPTION OF THE DRAWINGS

In the following, embodiments in accordance with the present invention are explained in more detail with reference to the accompanying drawings, in which.

DETAILED DESCRIPTION OF ILLUSTRATIVE EMBODIMENTS

Figure 1:
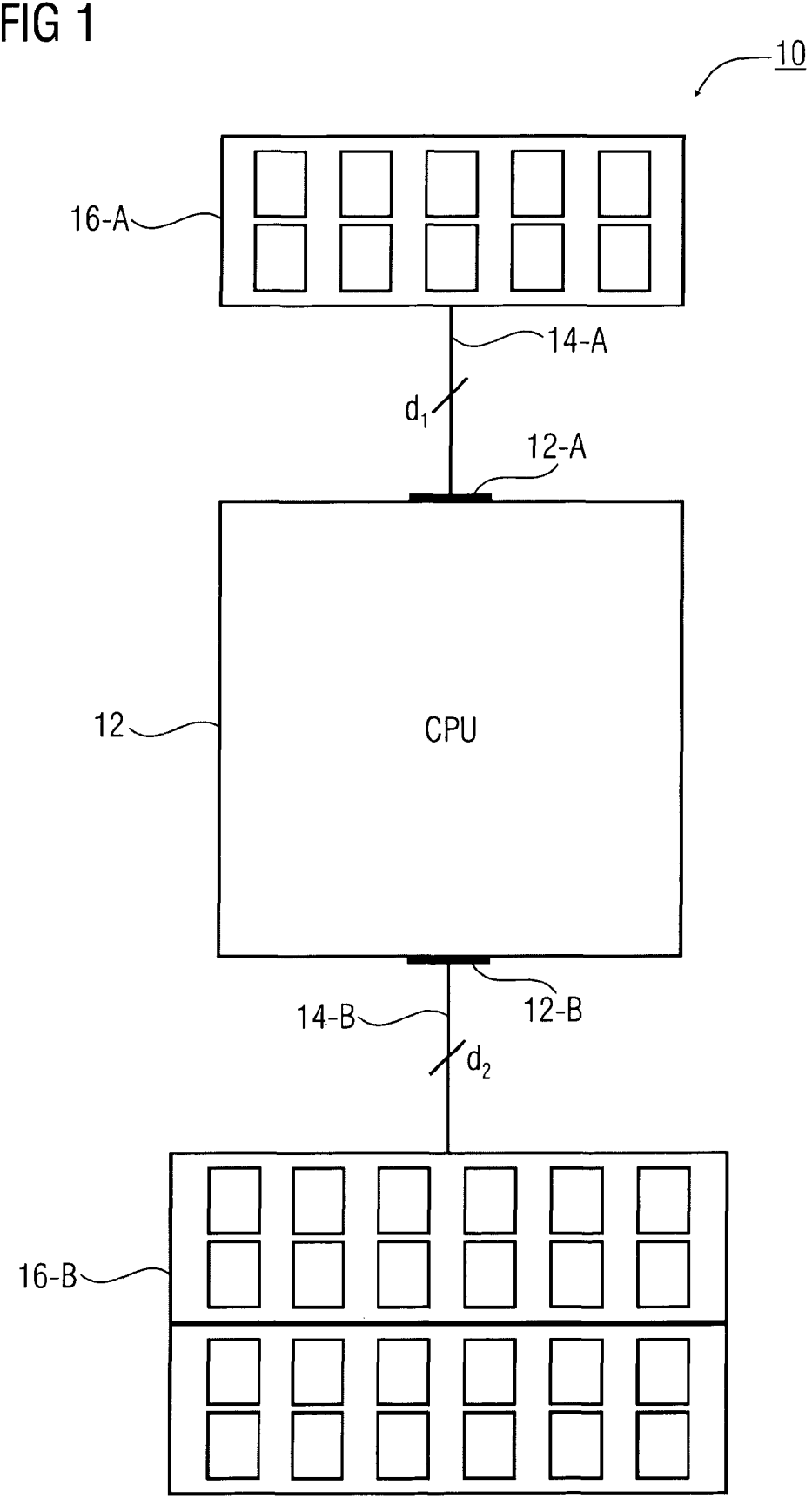
FIG. 1 shows a block diagram of a memory system according to an embodiment.

With regard to the following description, it should be noted that in the different embodiments equal or equally operating functional elements have the same reference numerals and thus the descriptions of those functional elements are exchangeable in the different embodiments as illustrated in the following.

FIG. 1 shows an overview of a memory system 10 according to an embodiment in accordance with the present invention.

The memory system 10 comprises a CPU 12 with a first interface 12-A, which can be coupled to a first memory channel 14-A with a first data bus width $d_1$, the first memory channel 14-A being configured to couple the CPU 12 to a first semiconductor memory unit 16-A. The first memory channel 14-A is configured or configurable to be clocked with a first clock frequency $f_{CLK,1}$. Further, the CPU 12 comprises a second interface 12-B to couple a second memory channel 14-B with a second data bus width $d_2$, the second memory channel 14-B being configured to couple the CPU 12 to a second semiconductor memory unit 16-B. The second memory channel 14-B is configured or configurable to be clocked with a second clock frequency $f_{CLK,2}$, smaller than the first clock frequency $f_{CLK,1}$, i.e., $f_{CLK,1} > f_{CLK,2}$. The databus width $d_1$ of the first memory channel 14-A may be identical to the databus width $d_2$ of the second memory channel 14-B, i.e., $d=d_1=d_2$. The databus width denotes a number of parallel signal lines for transmitting a plurality of bits temporarily in parallel from one or more memory modules towards the CPU or vice versa.

Embodiments in accordance with the present invention, hence, employ different types of memory channels inside the memory system 10. The first memory channel 14-A is running with a high bandwidth, resulting from the higher first clock frequency $f_{CLK,1}$, but comprises a limited density capability. In other words, only a limited number of memory modules, e.g., dual inline memory modules (DIMMs), can be coupled to the first memory channel 14-A.

The second memory channel 14-B is running at a lower bandwidth, resulting from the lower clock frequency $f_{CLK,2}$, but comprises a higher density capability. For example, a higher number of memory modules, e.g., DIMMs, can be connected to the second memory channel 14-B (e.g., when compared to the first memory channel 14-A).

According to some embodiments, the CPU 12 is adapted to identify certain portions of memory content to have a higher bandwidth requirement, as, for example, a memory content related to an operating system, and other portions with lower bandwidth requirement. Thus, a memory system according to some embodiments can then make use of both, a high memory bandwidth and high memory density, thereby increasing the overall performance over memory systems with high memory bandwidth but low memory density, or low memory bandwidth and high memory density.

According to some embodiments in accordance with the present invention, the first and second memory units 16-A, 16-B, are of the same memory hierarchy level. This means that the first and the second memory units 16-A, 16-B are, for example, memory units forming parts of a main memory of a computing device. Alternatively, the first and second memory units 16-A, 16-B may also, both at the same time, belong to a CPU cache memory. In some embodiments, the first and the second memory units 16-A, 16-B store independent data, respectively. In other words, the first memory channel 14-A is not intended to transfer data being a copy of parts of data transported by the second memory channel 14-B. Hence, the memory channels 14-A, 14-B can be regarded as memory channels for memory units of the same memory hierarchy level, the memory channels 14-A, 14-B running with different speeds, i.e., different frequencies, and correspondingly having different maximum memory density capabilities.

According to some embodiments, the first and the second memory units 16-A, 16-B are configured to be coupled to their respective memory channels 14-A, 14-B via first and second memory module sockets, respectively. This is the case, when the first and second memory units 16-A, 16-B are comprised by first and second DRAM dual in-line memory modules (DIMMs), respectively. A DIMM comprises a plurality of random access memory integrated circuits. DIMMs are mounted on a printed circuit board and are designed for use in computer systems. DIMMs typically have a 64-bit data path which can be coupled to one of the memory channels 14-A, 14-B with the bus width d. Hence, according to embodiments in accordance with the present invention, the bus width d of the first and second memory channel 14-A, 14-B, is equal to 64. Of course, this embodiment is only meant exemplarily and memory channels with different bus widths are also intended to be covered by embodiments described herein.

Since the first memory channel 14-A is running at a higher clock frequency than the second memory channel 14-B, the number of memory module sockets coupled to the first memory channel 14-A may, e.g., be smaller than the number of memory module sockets coupled to the second memory channel 14-B according to some embodiments. Increasing the speed of a memory channel sometimes leads to a reduced maximum number of sockets per memory channel due to signal integrity problems. Therefore, the first memory channel 14-A with the higher speed may be coupled to a smaller number of memory module sockets for DIMMs, in order to limit disturbances caused by the interconnections of the memory modules to the sockets at a given memory channel frequency.

Figure 2:
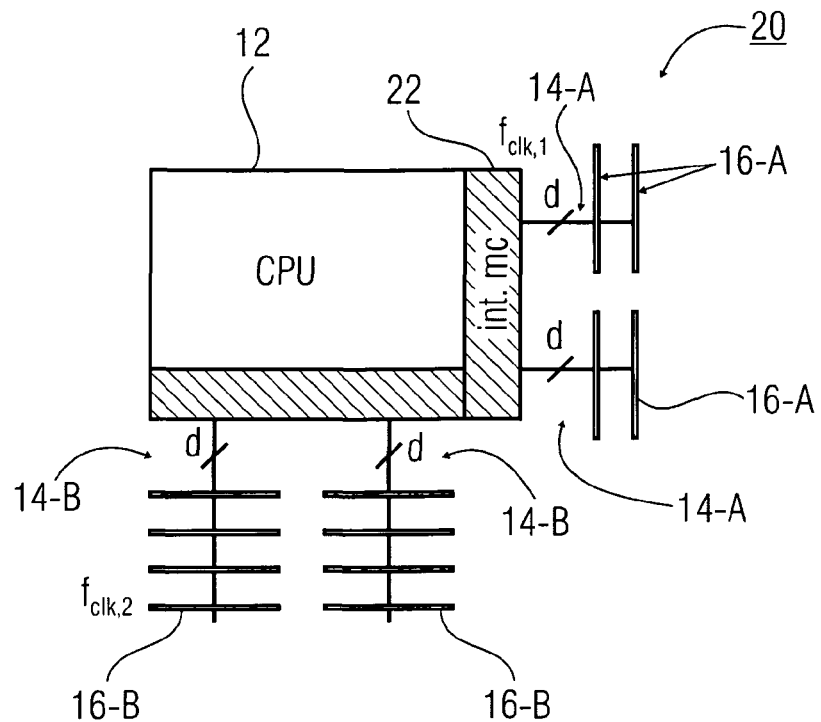
FIG. 2 shows an overview of a memory system according to a further embodiment.

A further embodiment of a memory system is shown in FIG. 2.

In the memory system 20 shown in FIG. 2, the central processing unit 12 comprises an integrated circuit 22 serving as an integrated memory controller. Thereby the integrated memory controller 22 manages a movement (in some cases even any movement) of data between the CPU 12 and the attached memory modules 16-A, 16-B. The integrated memory controller 22 regulates data transfer from the CPU 12 to the memory modules 16-A, 16-B for storage, or from a memory module to the CPU 12 for data processing in the CPU. For this reason, the integrated memory controller 22 comprises interfaces for a plurality of first memory channels 14-A, being configured to couple the CPU 12 to a plurality of first DRAM semiconductor memory units 16-A, comprised e.g. by a plurality of DIMMs. Each of the first memory channels 14-A is coupled to a first number $N_1$ of memory module sockets. In the example given by FIG. 2, the first number $N_1$ of memory module sockets is equal to 2. The memory module sockets are adapted to hold a DIMM, respectively, each DIMM comprising one or more random access memory integrated circuits.

Further, the integrated memory controller 22 is configured to couple a plurality of second memory channels 14-B, each of which is coupling a plurality of second semiconductor units 16-B to the integrated memory controller 22, or the CPU 12. For this purpose, each of the second memory channels 14-B is coupled to a second number $N_2$ of memory module sockets for holding the memory modules 16-B, wherein the second number $N_2$ of memory module sockets is larger than the first number $N_1$ of memory module sockets, i.e. $N_2 > N_1$. In the example given by FIG. 2, the second number $N_2$ of memory module sockets is equal to 4. According to some embodiments in accordance with the present invention, a ratio of the first number $N_1$ of first memory module sockets to the second number $N_2$ of second memory module sockets may be chosen to be equal to the ratio of the second clock frequency $f_{CLK,2}$ to the first clock frequency $f_{CLK,1}$, i.e., $N_1/N_2 = f_{CLK,2}/f_{CLK,1}$. Different ratios $N_1/N_2$ or $f_{CLK,2}/f_{CLK,1}$ are, of course, also possible.

Commonly used clock frequencies for data channels are, e.g., 66 MHz, 100 MHz, 133 MHz, 166 MHz, 200 MHz, 266 MHz, 333 MHz, 400 MHz, etc. Hence if, for example, the first clock frequency $f_{CLK,1}=400$ MHz and the second clock frequency $f_{CLK,2}=200$ MHz, the number of DIMMs coupled to the first memory channel 14-A may be half of the number of DIMMS coupled to the second memory channel 14-B.

In FIG. 2 the pair of first memory channels 14-A and the pair of second memory channels 14-B can be seen as a dual-channel architecture, respectively, resulting in a total memory channel bandwidth of 2 d, respectively, to move data from the memory modules 16-A, 16-B to the CPU 12.

Figure 3:
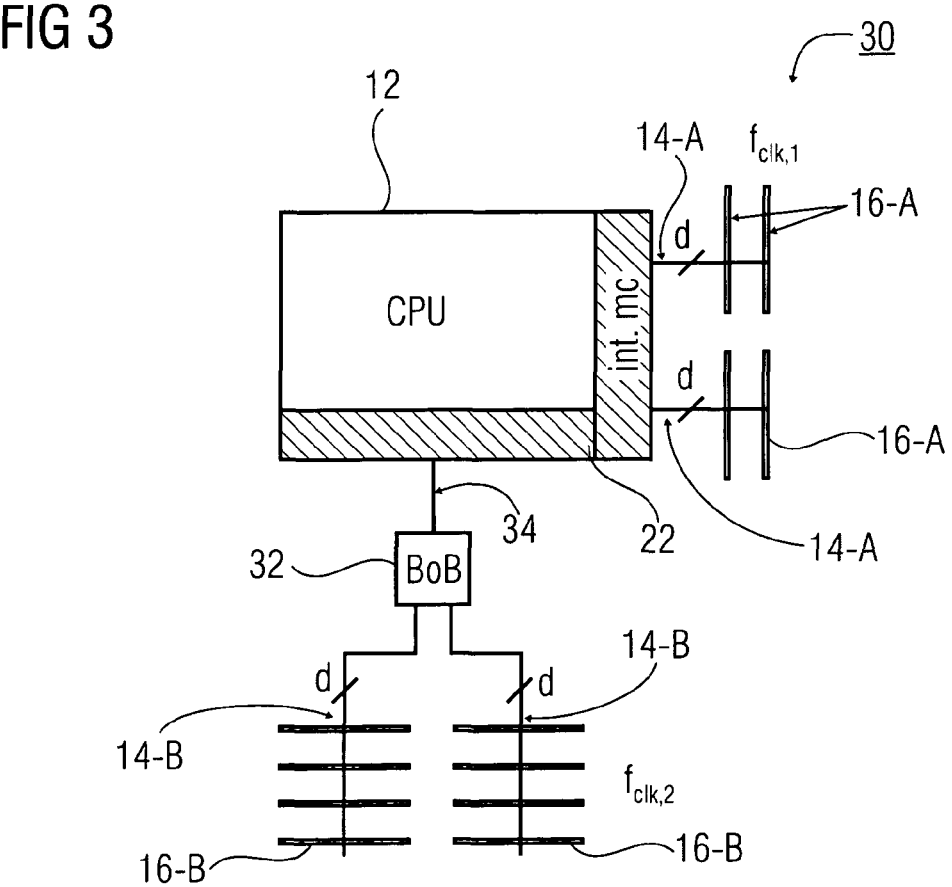
FIG. 3 shows an overview of a memory system with a CPU, a buffer chip and a plurality of memory channels according to an embodiment.

Referring now to FIG. 3, a further embodiment of a memory system according to an embodiment in accordance with the present invention is shown.

The memory system 30 shown in FIG. 3 differs from the one having been explained referring to FIG. 2, in that the second memory channels 16-B are indirectly coupled to the CPU 12 by means of a buffer chip 32 which can be integrated onto a main board. The buffer 32 is also commonly referred to as buffer on board (BoB). This solution may allow each of the second memory channels 14-B to support a higher number of memory modules 16-B compared to the embodiment described referring to FIG. 2. The buffer 32 is connected to the integrated memory controller 22 by means of a high-speed interface 34. This high-speed interface 34 may, according to embodiments, be clocked substantially higher than the second memory channels 14-B. Furthermore, the high-speed interface 34 may reduce the pin count at the CPU side, since the bus width of the high-speed interface 34 can be chosen substantially smaller than the data bus width d of the second memory channels 14-B. According to some embodiments in accordance with the present invention the high-speed interface 34 may also be a high-speed serial interface.

Figure 4:
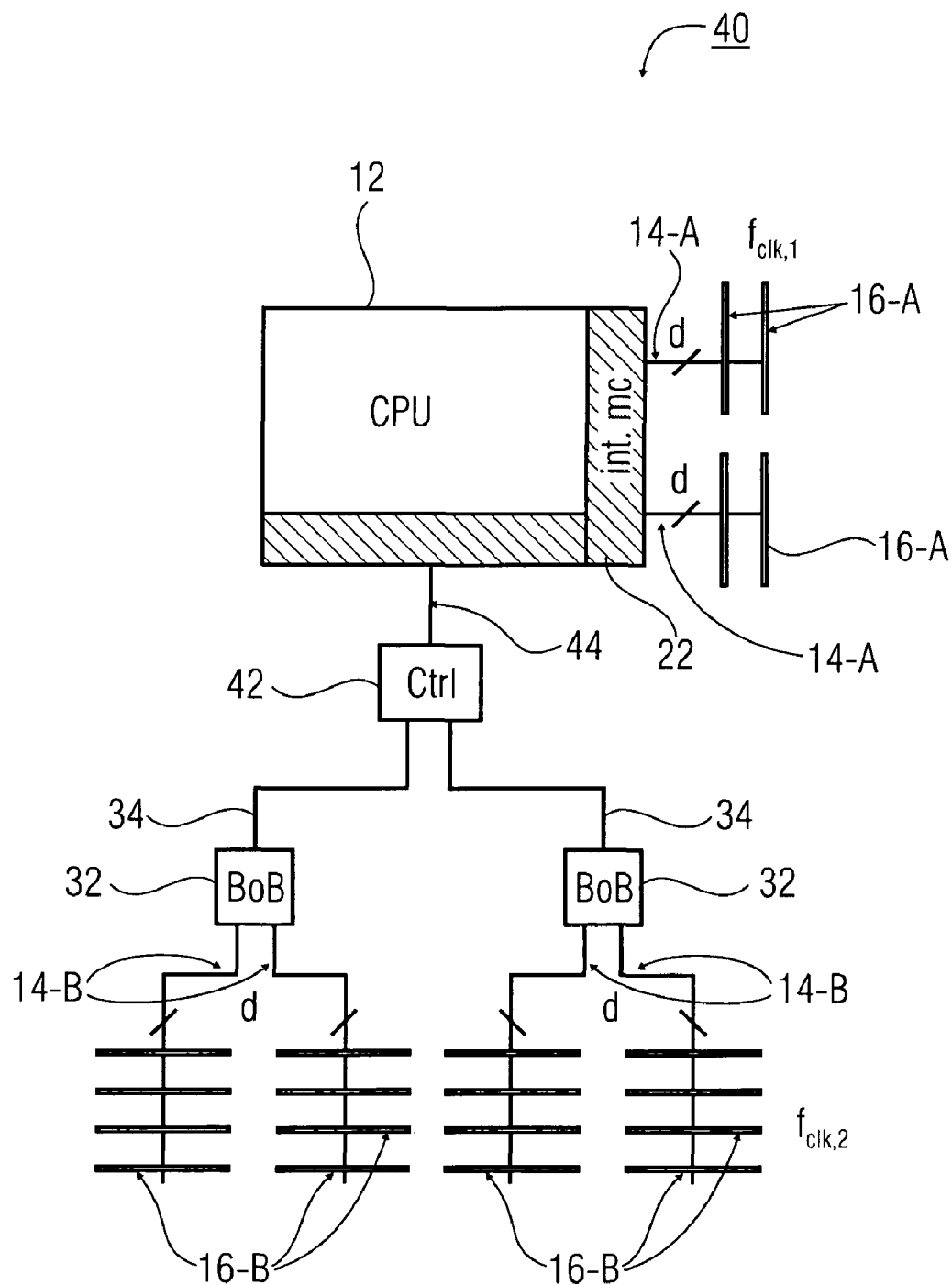
FIG. 4 shows an overview of a memory system with a plurality of memory channels coupled to a CPU via on-Board buffers and a memory controller according to an embodiment.

FIG. 4 shows a memory system 40 according to a further embodiment.

Here, the memory system 40 comprises two pairs of second memory channels 14-B, wherein each pair is coupled to a buffer 32, respectively, and wherein each of the two buffers is again coupled to a memory controller 42, which is located external to the CPU 12. The external memory controller 42 is coupled to the CPU via a high-speed interface commonly referred to as Front-Side-Bus (FSB). The Front-Side-Bus or system bus may be a physical bi-directional bus that carries all electronic signal information between the CPU 12 and the north bridge, also known as the memory controller hub (MCH). The buffers 32 may be connected to the external memory controller 42 via high-speed interfaces 34.

While embodiments have been explained, wherein the first memory channel 14-A is coupled to the CPU 12 via an internal or integrated memory controller 22, the first memory channel 14-A can be also coupled to the CPU 12 via an external memory controller according to further embodiments.

After having described embodiments in accordance with the present invention, wherein the first or second memory had been inserted in the memory channel as memory modules 16-A, 16-B via a module connector and connected to the CPU 12, or memory controller 22, 42, further embodiments will now be described, wherein the first memory is realized by single DRAM components. In one specific embodiment the first memory may also reside either on a CPU substrate or a memory controller substrate.

Figure 5:
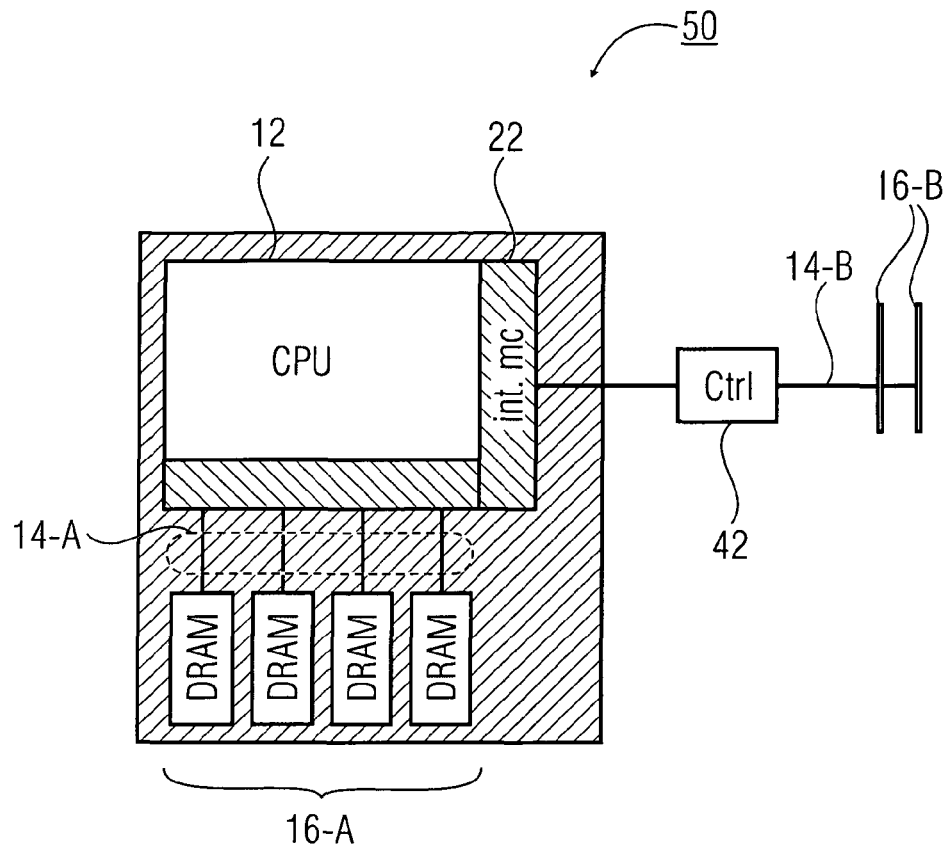
FIG. 5 shows an overview of a memory system comprising a CPU with a first memory channel based on single DRAM components and a second memory channel based on a memory controller and memory modules according to an embodiment.

FIG. 5 shows a memory system 50 according to yet a further embodiment in accordance with the present invention.

The memory system 50 comprises a CPU 12 with an internal memory controller 22 which is coupled to first memory units 16-A via a first memory channel 14-A. The first memory units 16-A comprise single DRAM components which are placed on the same substrate as the CPU 12, e.g. by soldering. Second memory modules 16-B are located externally from the CPU substrate, and are connected to the CPU 12 via a second memory channel 14-B between the second memory modules 16-B and the internal memory controller 22. An additional external memory controller 42 could be placed in between the second memory modules 16-B and the CPU 12, according to embodiments. According to a further embodiment, the DRAM components of the first memory unit 16-A could be graphics double data rate (GDDR) memory components soldered down on the CPU substrate. Having the first memory unit 16-A close to the CPU 12 on the same substrate allows for higher clock frequencies $f_{CLK,1}$ compared to some embodiments with external first memory modules 16-A.

Figure 6:
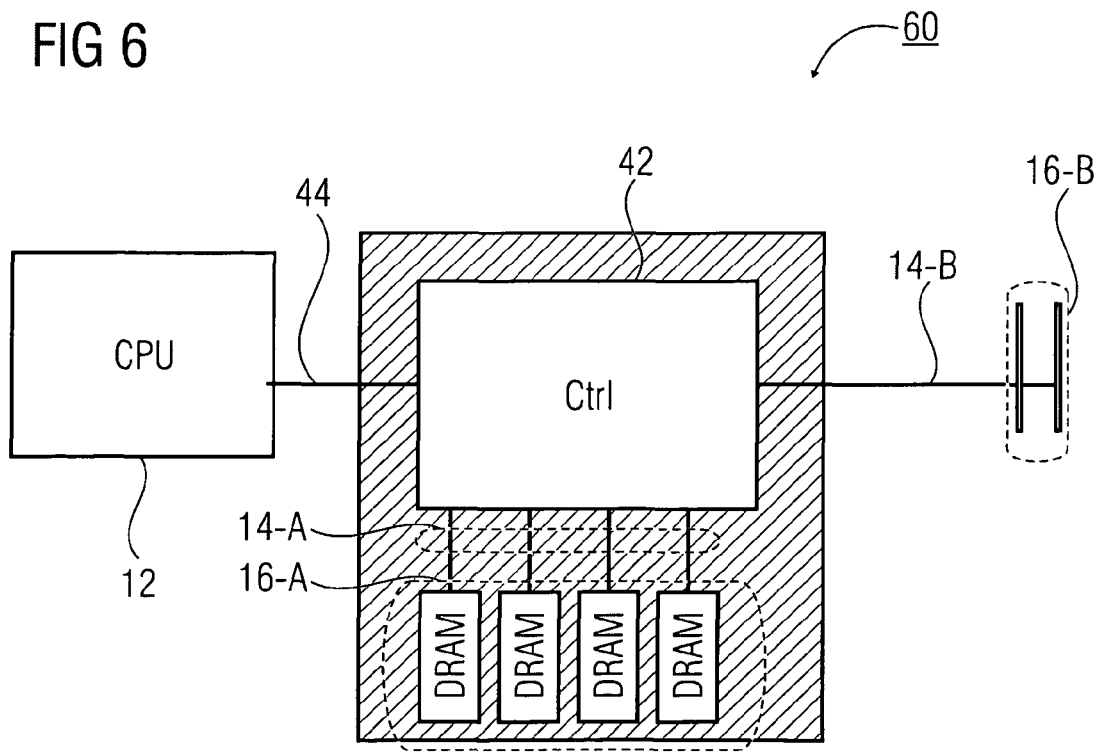
FIG. 6 shows an overview of a memory system comprising a CPU and a memory controller with a first memory channel based on single DRAM components and a second memory channel based on memory modules according to an embodiment.

FIG. 6 shows an embodiment of a memory system in accordance with the present invention.

Compared to the embodiment shown in FIG. 5, the memory system 60 of FIG. 6 comprises a CPU 12 not having an integrated memory controller and first memory modules placed on the same substrate. In contrast, the CPU 12 is coupled to an external memory controller 42 via a front side bus 44. The external memory controller 42 comprises a first memory unit 16-A comprising DRAM components arranged on the same substrate as the external memory controller 42. The DRAM components of the first memory unit 16-A are coupled to the external memory controller 42 via one or a plurality of first memory channels 14-A. The one or the plurality of first memory channels 14-A are also placed on the same substrate as the external memory controller 42 and the first memory unit 16-A, allowing for a layout with short signal paths. The DRAM components of first memory unit 16-A may also be GDDR (e.g. GDDR4, GDDR5) memory components soldered down on the external memory controller's substrate. Second memory modules 16-B are coupled to the external memory controller 42 via one or a plurality of second memory channels 14-B. The second memory modules 16-B are thereby located outside, namely externally from the external memory controller 42.

According to some embodiments in accordance with the present invention, there may also be a hierarchical structure of the first and second memory channels 14-A, 14-B. That is, the slower second memory channels 14-B may be configured to act as a swap space for the faster first memory channels 14-A.

If the slow memory channels 14-B are not fully populated, e.g., if the memory module sockets associated with the second memory channels 14-B are not fully populated with memory modules, the second memory channels 14-B may be clocked with same frequency as the first memory channels 14-A.

To summarize, embodiments described herein relate to a concept for a memory system having different memory channels in parallel, the different memory channels running at different speeds and correspondingly having different maximum memory density capabilities.

While the invention has been described in terms of several embodiments, there are alterations, permutations and equivalents, which fall within the scope of the invention. It should also be noted that there are many alternative ways of implementing the methods and compositions of the present invention. It is therefore intended that the following appended claims be interpreted as including all such alterations, permutations and equivalents.

What is claimed is:

1. A system comprising:
    a central processing unit;
    a first memory channel coupling the central processing unit to a first semiconductor memory unit, wherein the first memory channel is clocked with a first clock frequency; and
    a second memory channel coupling the central processing unit to a second semiconductor memory unit, wherein the second memory channel is clocked with a second clock frequency smaller than the first clock frequency, the second memory channel being separate from the first memory channel,
    wherein a databus width of the first memory channel is identical to a databus width of the second memory channel, and
    wherein the first and second memory units are configured to be capable of storing independent data, and
    wherein the first memory channel is directly coupled to a memory controller being integrated into the central processing unit and wherein the second memory channel is indirectly coupled to the memory controller via a buffer chip external to the central processing unit.

2. The system according to claim 1, wherein the first and second memory units are of the same memory hierarchy level.

3. The system according to claim 1, wherein the first memory unit does not store data as a copy of data stored in the second semiconductor memory unit.

4. The system according to claim 1, wherein the first memory channel comprises one or more first memory module sockets configured to establish a connection to the first semiconductor memory unit, and wherein the second memory channel comprises one or more second memory module sockets configured to establish a connection to the second semiconductor memory unit.

5. The system according to claim 4, wherein a number of the first memory module sockets is smaller than a number of second memory module sockets.

6. The system according to claim 1, wherein the first and the second memory units are comprised by first and second DRAM dual in-line memory modules.

7. The system according to claim 1, wherein the central processing unit comprises an integrated circuit serving as a memory controller, the memory controller having a first data interface coupled to the first memory channel and a second data interface coupled to the second memory channel.

8. The system according to claim 1, wherein the first memory channel is directly coupled to the central processing unit via a memory controller integrated into the central processing unit, and wherein the second memory channel is coupled to the central processing unit via a memory controller external to the central processing unit.

9. The system according to claim 8, wherein the second memory channel is coupled to the external memory controller via a buffer chip.

10. The system according to claim 1, wherein the first semiconductor memory unit is placed on a same substrate as the central processing unit.

11. The system according to claim 1, wherein the first semiconductor memory unit is placed on a same substrate as a memory controller.

12. A system comprising:
    a central processing unit;

a first memory channel coupling the central processing unit to first DRAM memory units belonging to a first memory hierarchy level, wherein the first memory channel is clocked with a first clock frequency; and a second memory channel, separate from the first memory channel the central processing unit to second DRAM memory units also belonging to the first memory hierarchy level, wherein the second memory channel is clocked with a second clock frequency smaller than the first clock frequency, and wherein the first memory hierarchy level denotes memory belonging to a main memory of the system, and wherein a databus width of the first memory channel is identical to a databus width of the second memory channel, wherein one of the first memory channel and the second memory channel is directly coupled to a memory controller being integrated into the central processing unit and wherein the other of the first memory channel and the second memory channel is indirectly coupled to the memory controller via a buffer chip external to the central processing unit.

13. The system according to claim 12, wherein the first memory channel comprises one or more first memory module sockets configured to establish a connection to the first DRAM memory unit, and wherein the second memory channel comprises one or more second memory module sockets configured to establish a connection to the second DRAM memory unit.

14. The system according to claim 13, wherein a number of the first memory module sockets is smaller than a number of second memory module sockets.

15. The system according to claim 12, wherein the first DRAM memory unit is comprised by a first DRAM dual in-line memory module and the second DRAM memory unit is comprised by a second DRAM dual in-line memory module.

16. The system according to claim 12, wherein the central processing unit comprises an integrated circuit serving as a memory controller, the memory controller having a first data interface coupled to the first memory channel and a second data interface coupled to the second memory channel.

17. The system according to claim 12, wherein the first memory channel is directly coupled to the central processing unit via a memory controller integrated into the central processing unit, and wherein the second memory channel is coupled to the central processing unit via a memory controller external to the central processing unit.

18. The system according to claim 17, wherein the second memory channel is coupled to the external memory controller via a buffer chip.

19. The system according to claim 12, wherein the first DRAM memory unit is placed on a same substrate as the central processing unit.

20. The system according to claim 12, wherein the first memory unit is placed on a same substrate as a memory controller.

21. An apparatus comprising:
means for processing data;
means for coupling the means for processing data to a first semiconductor memory unit via a first means for transporting data;
means for clocking the first means for transporting data with a first clock frequency;
means for coupling the means for processing data to a second semiconductor memory unit via a second means for transporting data, wherein the second means for transporting data is separate from the first means for transporting data;
means for clocking the second means for transporting data with a second clock frequency smaller than the first clock frequency, and
wherein a databus width of the first means for transporting data is identical to a databus width of the second means for transporting data and
wherein the first means for transporting data is directly coupled to a memory controller being integrated into the means for processing data and wherein the second means for transporting data is indirectly coupled to the means for processing data via a buffer chip external to the means for processing data.

22. A method comprising:
coupling a central processing unit to a first semiconductor memory unit via a first memory channel, wherein the first memory channel is clocked with a first clock frequency; and
coupling the central processing unit to a second semiconductor memory unit via a second memory channel that is separate from the first memory channel, wherein the second memory channel is clocked with a second clock frequency smaller than the first clock frequency, and
wherein a databus width of the first memory channel is identical to a databus width of the second memory channel and
wherein the first memory channel is directly coupled to a memory controller being integrated into the central processing unit and wherein the second memory channel is indirectly coupled to the memory controller via a buffer chip external to the central processing unit.

* * * * *

UNITED STATES PATENT AND TRADEMARK OFFICE
CERTIFICATE OF CORRECTION

| | | |
|---|---|---|
| PATENT NO. | : 8,271,827 B2 | Page 1 of 1 |
| APPLICATION NO. | : 11/953694 | |
| DATED | : September 18, 2012 | |
| INVENTOR(S) | : Christoph Bilger | |

It is certified that error appears in the above-identified patent and that said Letters Patent is hereby corrected as shown below:

On the Title Page

(73)    Assignee should read:    Qimonda AG, Munich (DE)

Signed and Sealed this
Eighth Day of April, 2014

Michelle K. Lee
*Deputy Director of the United States Patent and Trademark Office*